(12) United States Patent
Wholey, III et al.

(10) Patent No.: US 7,164,422 B1
(45) Date of Patent: Jan. 16, 2007

(54) PARAMETERIZED GRAPHS WITH CONDITIONAL COMPONENTS

(75) Inventors: Joseph Skeffington Wholey, III, Cambridge, MA (US); Brond Larson, Holliston, MA (US); Glenn John Allin, Arlington, MA (US); Tim Wakeling, Andover, MA (US); Martin A. Serrano, Charlestown, MA (US); Craig W. Stanfill, Waltham, MA (US)

(73) Assignee: Ab Initio Software Corporation, Lexington, MA (US)

( * ) Notice: Subject to any disclaimer, the term of this patent is extended or adjusted under 35 U.S.C. 154(b) by 132 days.

(21) Appl. No.: 09/627,252

(22) Filed: Jul. 28, 2000

(51) Int. Cl.
*G06T 11/20* (2006.01)
(52) U.S. Cl. .................................. 345/440.1; 717/156
(58) Field of Classification Search ............... 345/703, 345/704, 700, 761, 762, 811, 701, 702, 619, 345/440.1; 717/153, 156, 158
See application file for complete search history.

(56) References Cited

U.S. PATENT DOCUMENTS

| | | | | |
|---|---|---|---|---|
| 5,701,400 | A * | 12/1997 | Amado | 706/45 |
| 5,966,072 | A * | 10/1999 | Stanfill et al. | 340/440 |
| 6,006,242 | A * | 12/1999 | Poole et al. | 715/531 |
| 6,061,516 | A | 1/2000 | Horikiri | |
| 6,088,716 | A * | 7/2000 | Stanfill et al. | 718/106 |
| 6,173,276 | B1 * | 1/2001 | Kant et al. | 706/50 |
| 6,208,345 | B1 * | 3/2001 | Sheard et al. | 715/853 |
| 6,272,650 | B1 * | 8/2001 | Meyer et al. | 714/38 |
| 6,324,437 | B1 * | 11/2001 | Frankel et al. | 700/90 |
| 6,400,996 | B1 * | 6/2002 | Hoffberg et al. | 345/810 |
| 6,538,651 | B1 * | 3/2003 | Hayman et al. | 345/419 |
| 6,816,825 | B1 * | 11/2004 | Ashar et al. | 703/14 |

FOREIGN PATENT DOCUMENTS

| | | |
|---|---|---|
| JP | 63-231613 | 9/1988 |
| JP | 2000-99317 | 4/2000 |

OTHER PUBLICATIONS

Schematic Capture with MicroSim PSpice, 2nd Ed., Marc. E. Herniter, Prentice Hall, Upper Saddle River, N.J, 1996. This book comes with a CD that contains an evaluation version of PSpice. ISBN 0-13-233982-X.*

* cited by examiner

*Primary Examiner*—Kee M. Tung
*Assistant Examiner*—J. Amini
(74) *Attorney, Agent, or Firm*—Fish & Richardson P.C.

(57) ABSTRACT

A method, system, and program for providing runtime graph parameters and conditional components for data flow graphs. Runtime parameters allow an application builder to defer the value of a parameter setting to runtime. The values of runtime parameters may be supplied by the end user or be derived from a combination of other runtime parameters or objects stored in an object repository. A developer may specify a prompt for each parameter and the conditions for displaying the prompt, which are used to determine a graphical user interface control for receiving the parameter value. A conditional components mechanism permits changes to a graph structure based on parameter values and computed metadata. Each component of a graph has a condition which controls whether or not that component will appear in the graph at runtime. The condition can be computed directly or indirectly through runtime parameters.

30 Claims, 14 Drawing Sheets

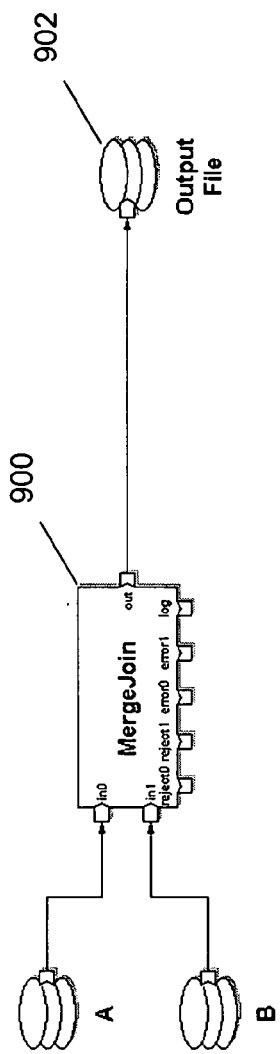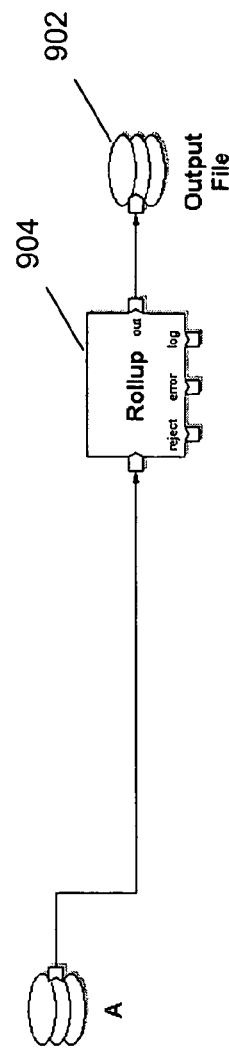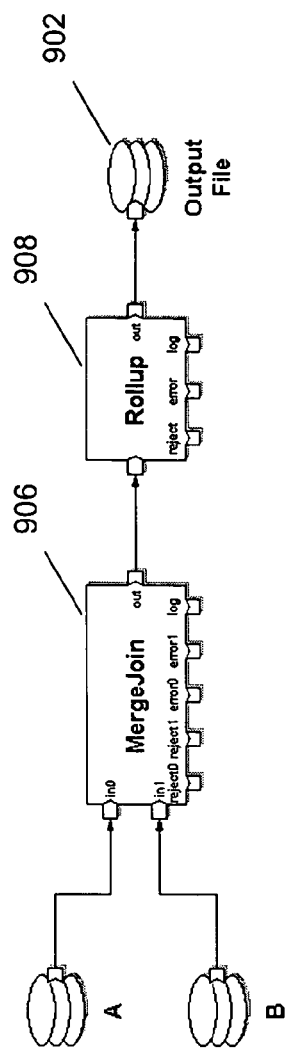
FIG. 9A
Join A and B
FIG. 9B
Aggregate A
FIG. 9C
Join A & B, then aggregate

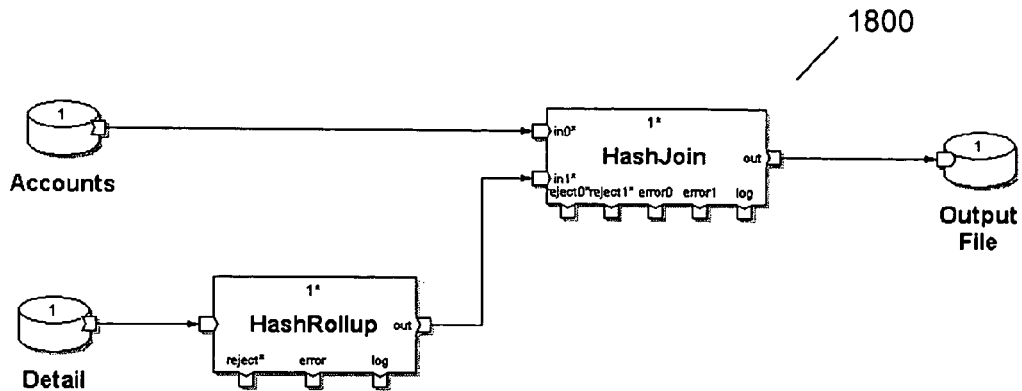
FIG. 18
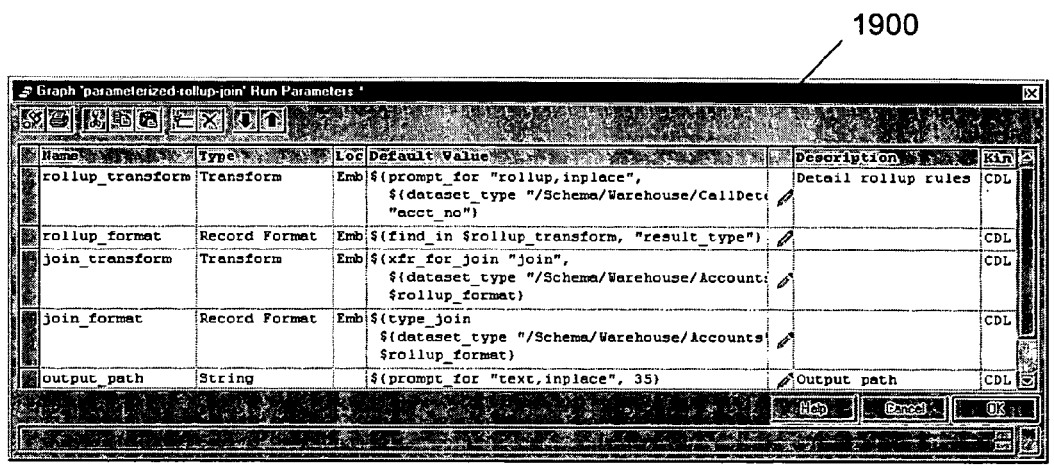
FIG. 19
| | Compute | Source field | Expression | Where | Out |
|---|---|---|---|---|---|
| 2002 → Detail rollup rules | | value of | | | ⇒ |
| | | value of | | | ⇒ |
| | | value of | | | ⇒ |
| | | value of | | | ⇒ |
| | | value of | | | ⇒ |
| Output path | | | | | |
FIG. 20

PARAMETERIZED GRAPHS WITH CONDITIONAL COMPONENTS

TECHNICAL FIELD

The invention relates to the control of computations in data processing systems and, more particularly, to creation and execution of computer programs expressed as parameterized data flow graphs.

BACKGROUND

Complex business systems typically process data in multiple stages, with the results produced by one stage being fed into the next stage. The overall flow of information through such systems may be described in terms of a directed data flow graph, with vertices in the graph representing components (either data files or processes), and the links or "edges" in the graph indicating flows of data between components.

The same type of graphic representation may be used to describe parallel processing systems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. Again, the graphs will be composed of components (data files or processes) and flows (graph edges or links). By explicitly or implicitly replicating elements of the graph (components and flows), it is possible to represent parallelism in a system.

Graphs also can be used to invoke computations directly. The "CO>OPERATING SYSTEM®" with Graphical Development Environment (GDE) from Ab Initio Software Corporation, Lexington, Mass. embodies such a system. Graphs made in accordance with this system provide methods for getting information into and out of individual processes represented by graph components, for moving information between the processes, and for defining a running order for the processes. This system includes algorithms that choose interprocess communication methods and algorithms that schedule process execution, and also provides for monitoring of the execution of the graph.

Developers quite often build graphs that are controlled in one way or another through the use of environment variables or command-line arguments which enable generation of instructions (e.g., shell scripts) that are translated into executable instructions by a graph compiler at "runtime" (i.e., when the graph is executed). Environment variables and command-line arguments thus become ad hoc parameters for specifying information such as file names, data select expressions, and keys (e.g., sort keys), making the applications more flexible. However, the use of environment variables and command-line arguments in this way can obscure a graph and make it harder for both humans and programs to understand. The most serious problem with this approach is that the graph has no well-defined user interface. For example, a user may have to read a generated shell script and search it for references to environment variables and command-line arguments to find the set of parameters that control the execution of a particular graph.

An additional problem with existing graphs are that they cannot be arbitrarily redrawn at run-time based on the needs of a particular application or dataset. Thus, if two applications are quite similar, but not identical, a developer may be required to create separate graphs for each application.

Accordingly, the inventors have determined that it would be useful to provide a system and method for providing parameterized graphs. The inventors have also determined that while runtime parameters allow a developer to create flexible applications, there are situations in which it is also desirable to change the graph itself based on parameter values. Accordingly, the inventors have determined that it would also be useful to provide a system and method of graphs that can include conditional components.

SUMMARY

The invention formalizes the parameterization of data flow graphs to allow runtime parameters. Runtime parameters allow an application builder to defer the value of a parameter setting (e.g., the key parameter of a sort function, file names, record formats, transform functions, etc.) to runtime (i.e., the time an application is executed on a computer system). The values of runtime parameters may be supplied by the end user or be derived from a combination of other runtime parameters or objects stored in an object repository.

Runtime parameters add a certain amount of flexibility to an application. Additional flexibility is achieved by using those parameters to compute metadata (data formats or types, and program logic or transforms) on demand. Types and transforms may be synthesized from other types and transforms, user-supplied parameter values, and stored objects (e.g., from a repository). This makes it possible to build "generic" applications that work on input data of any type, or that produce data through a series of transforms whose construction is controlled, directly or indirectly, through runtime parameter values.

In the preferred embodiment, when creating or editing a runtime parameter, a developer may specify a prompt for each parameter and the conditions for displaying the prompt. The preferred embodiment interprets the prompting directives to present, if conditions are met, a graphical user interface (GUI) control for receiving the parameter value.

One embodiment of the invention includes a conditional components mechanism that permits changes to a graph structure based on parameter values and computed metadata. Each component of a graph has a condition which controls whether or not that component will appear in the graph at runtime. The condition can be computed directly or indirectly through runtime parameters. Conditional components can be used to optimize or specialize graphs.

In particular, in one aspect, the invention includes a method, system, and computer program for executing a graph having components with runtime parameters, including retrieving a runtime parameter for the graph at runtime execution of the graph, the runtime parameter having a value defined as determinable at runtime execution of the graph; determining whether the value for the runtime parameter is to be provided by user input; displaying a prompt to a user for receiving user input for every runtime parameter so determined; determining a first final parameter value based on any user response to such prompt; and executing the graph using the first final parameter value as the value for the runtime parameter. The value for the runtime parameter may also be externally supplied programmatically.

In another aspect, the invention includes a method, system, and computer program for modifying a graph at runtime execution of the graph, including determining at runtime execution of the graph whether any component of the graph is defined as being a conditional component having a condition and a condition-interpretation; evaluating the condition for every such conditional component; and modifying the graph at runtime execution of the graph in accordance with such evaluation and the corresponding condition-interpretation of such conditional component. One evaluation of the condition and the corresponding condition-interpretation for such conditional component causes removal of the conditional component and all connected flows to such conditional component from the graph before execution of the graph. Another evaluation of the condition and the corresponding condition-interpretation for such conditional component causes the conditional component to be replaced by a flow in the graph before execution of the graph.

Thus, the basic concept of expressing computations as data flow graphs has been extended in the following ways:

The interface of a graph in terms of runtime parameters has been formalized. The interface for a graph has been defined well enough for the system to know what parameters need to be supplied and how they should be prompted for.

The metadata that controls components can be specified or computed, directly or indirectly, by runtime parameters.

The structure of a graph can be modified based on the values of runtime parameters controlling conditional components, so that components are present or absent based on user choices.

The combination of these features results in a substantially more powerful system for processing data.

A benefit of runtime parameterization of graphs is that an application can be parameterized richly enough to enable end users, such as business analysts and statistical modelers, to request data that meets their needs. The complexity of modern corporate data environments has led to a state of affairs in which a significant amount of direct human involvement is usually needed in the process of data collection and pre-analysis transformation. The invention provides powerful tools to end users that enables them to define and retrieve the data they want without requiring expert data analyzers in the critical path for each query type.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9A is a block diagram of a first graph in which a MergeJoin component joins data from files A and B and outputs the result to an output file.

FIG. 9B is a block diagram of a second graph in which a Rollup component aggregates data from file A and outputs the result to an output file.

FIG. 9C is a block diagram of a graph in which a MergeJoin component joins data from files A and B, and a Rollup component aggregates the resulting data and outputs a final result to an output file.

FIG. 18 is a diagram of a graph representing a runtime parameterized rollup and join application.

FIG. 19 is a diagram of one embodiment of a graphical dialog representing a runtime parameters grid for the example application of FIG. 18.

FIG. 20 is a diagram of one embodiment of a graphical dialog representing a form generated by the Web Interface from the information in the parameters grid of FIG. 19.

Like reference symbols in the various drawings indicate like elements.

DETAILED DESCRIPTION

Overview

Figure 1:
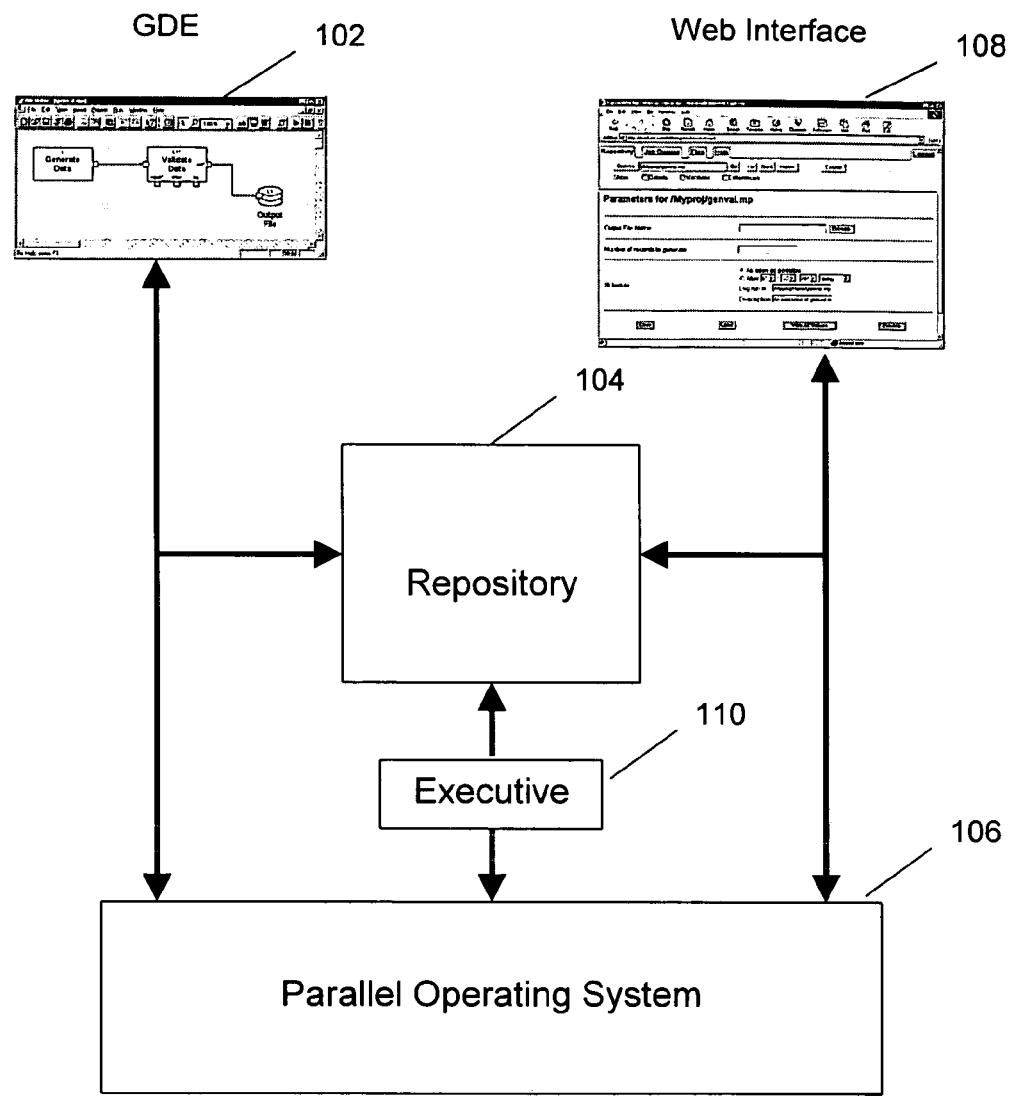
FIG. 1 is a block diagram of one embodiment of the invention showing the interrelationship of principal elements.

FIG. 1 is a block diagram of one embodiment of the invention showing the interrelationship of principal elements. A graphic development environment (GDE) 102 provides a user interface for creating executable graphs and defining parameters for the graph components.

The GDE may be, for example, the CO>OPERATING SYSTEM® GDE available from the assignee of the present invention. The GDE 102 communicates with a repository 104 and a parallel operating system 106. Also coupled to the repository 104 and the parallel operating system 106 are a Web Interface 108 and an executive 110.

The repository 104 preferably is a scalable object-oriented database system designed to support the development and execution of graph-based applications and the interchange of metadata between the graph-based applications and other systems (e.g., other operating systems). The repository 104 is a storage system for all kinds of metadata, including (but not limited to) documentation, record formats, transform functions, graphs, jobs, and monitoring information. Repositories are known in the art; see, for example, U.S. Pat. Nos. 5,930,794; 6,032,158; 6,038,558; and 6,044,374.

The parallel operating system 106 accepts the graphical representation of a data flow graph generated in the GDE 102 and generates computer instructions that correspond to the processing logic and resources defined by the graph. The parallel operating system 106 then typically executes those instructions on a plurality of processors (which need not be homogeneous). A suitable parallel operating system is the CO>OPERATING SYSTEM® available from the assignee of the present invention.

The Web Interface 108 provides a web-browser-based view of the contents of the repository 104. Using the Web Interface 108, a user may browse objects, create new objects, alter existing objects, specify application parameters, schedule jobs, etc. The Web Interface 108 automatically creates a forms-based user interface for a parameterized graph based on information stored in the repository 104 for the graph's runtime parameters.

The executive 110 is an optional repository-based job scheduling system accessed through the Web Interface 108. The executive 110 maintains jobs and job queues as objects within the repository 104, and the Web Interface 108 provides a view of and facilities to manipulate jobs and job queues. Such scheduling functions are well known in the art. Note that use of the invention does not require utilization of an executive.

Figure 2:
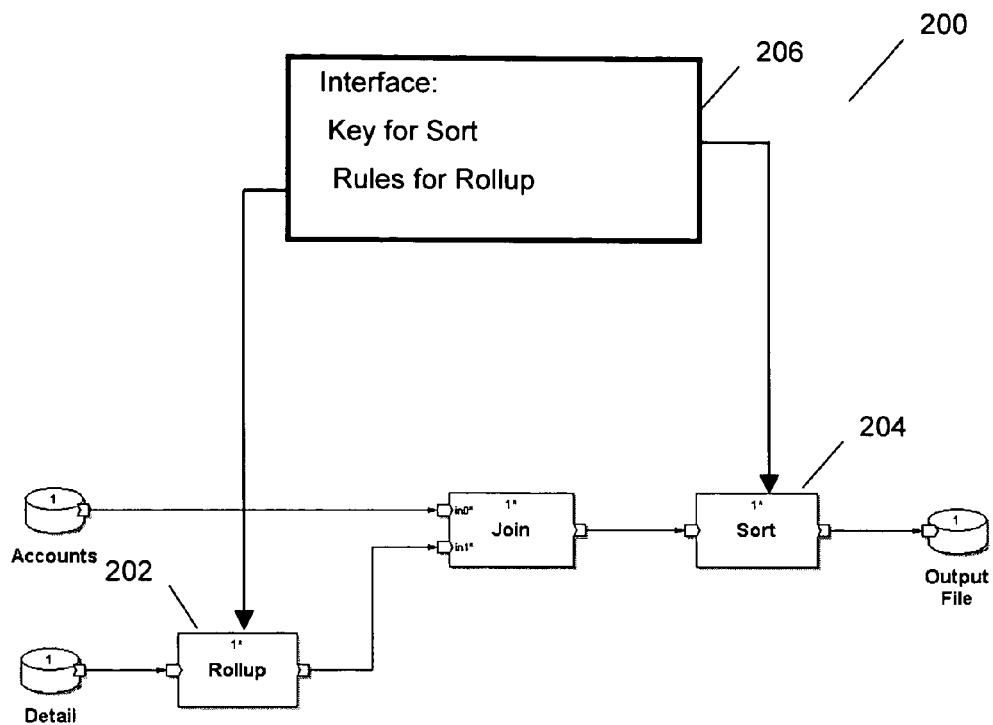
FIG. 2 is a block diagram of a typical graph having a rollup component and a sort component 204 with designated runtime parameters.

FIG. 2 is a block diagram of a typical graph 200 having a rollup component 202 and a sort component 204 with designated runtime parameters. The runtime parameters (a key for the sort component 204 and rules for the rollup component 202) would be presented to a user in an interface 206 for input. The following sections describe how to designate a runtime parameter, and create an integrated user interface for presentation of runtime parameters requiring user input.

Designation of Runtime Parameters

Runtime parameters provide a mechanism for a developer to modify the behavior of a graph based on external input at graph execution time (i.e., runtime). In the preferred embodiment, these external values are provided by direct user input. However, these external values also may come from a number of different sources, including environment variables and command line parameters. The GDE 102 generates the correct code to handle all of these situations as well as prompting the developer for test values when the graph is executed directly from the GDE. Using runtime parameters, a developer can, for example, explicitly declare that the path of an input file will be provided by an environment variable with a particular name; that environment variable then becomes a known part of the graph's interface. Thus, there is a well-defined interface to such parameters. There is no need, for example, to read a generated shell script and search it for references to environment variables and command-line arguments to find the set of parameters that control the execution of a particular graph.

Figure 3:
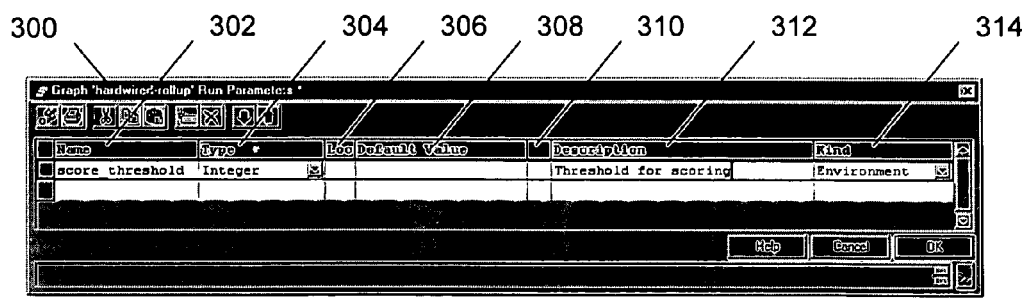
FIG. 3 is a diagram of one embodiment of a graphical dialog representing a runtime parameters grid that would be associated with a graph.

A runtime parameter may be designated or defined in a number of ways. One way is by use of a runtime parameters grid displayed in the GDE 102. FIG. 3 is a diagram of one embodiment of a graphical dialog representing a runtime parameters grid 300 that would be associated with a graph. A new runtime parameter is created by simply filling in the required fields. An object associated with each runtime parameter is created in the repository 104 and linked to all graph components that utilize the parameter. For example, if a sort key for a graph sort component is defined as a runtime parameter, an object representing the sort key parameter is stored in the repository 104 and linked to the associated sort component. An alternative way of defining a runtime parameter is to specially flag an existing parameter of a graph component and make it "visible" (export it) to other components. A combination of these methods may be used. For example, when creating a component, a developer may designate a particular parameter of that component as a runtime parameter. The developer may then use a parameter grid to set default values and other characteristics of all of the runtime parameters for a graph, and define new runtime parameters.

When the graph is run, the parameters are processed to obtain values for each parameter from user input or from external programmatic sources (e.g., command line parameters or environmental variables). In the illustrated embodiment, the runtime parameters grid 300 includes the following fields:

Name 302—This field contains the name of the runtime parameter. "Score_threshold" is the example shown for a name.

Type 304—This field contains the type of value to be allowed in the runtime parameter. "Integer" is the example shown for a type. Supported types in the illustrated embodiment are:
- boolean—value can be either True or False;
- choice—value is one of a list of values;
- collator—a key parameter value;
- dataset—an external data file name and location;
- date—a date value;
- expression—an arithmetic, logical, and/or conditional expression (e.g., a select expression);
- float—a floating point number;
- integer—an integer number;
- layout—a parallel or serial layout definition;
- record format—a record description or a file containing a record description;
- string—an arbitrary character string;
- transform—a transform description or a file containing a transform description.

Location (Loc) 306—This field is used with record format and transform types. It specifies whether the type field 304 describes a file location or whether it contains an embedded description. Supported locations are:
- Embedded—the parameter will contain the record or transform description;
- Host—the parameter will contain a reference to a file on a host machine;
- Local—the parameter will contain a reference to a file on a local machine;
- Repository—the parameter will contain a reference a repository transform or record format.

Default Value 308—This field contains either (1) the default value for the runtime parameter which will be used if no other value is provided from an external programmatic source, or (2) a rule or expression describing how to derive the runtime value from user input or how to obtain that information interactively from the user executing the graph. In the latter case, a second default value field (not shown) may be used to provide a value for the runtime parameter if the user does not provide an input value. For types of "boolean" and "choice", this field limits the user to the valid choices. For "layout" types, this field is read-only and displays the currently defined layout definition. For all other types, this field preferably is a simple text editor into which the user may type a valid string.

Edit 310—Clicking on the edit space 310 (or an icon; for example, a pencil icon) in a parameter row will bring up a more advanced edit window, which walks a user through the various options for editing the default value field 308. In the illustrated embodiment, the following editors are available for their associated types:

Single line edit—for integer, float, date and string types;
Choice dialog—for boolean and choice types;
Key Editor—for a collator type;
File Browser—for a dataset type and for record format and transform types where the location is not embedded;
Transform Editor—for a transform type with a location of Embedded;
Record Format Editor—for a record format type with a location of Embedded;
Expression Editor—for an expression type;
Layout Editor—for a layout type.

The above editors are launched unless the Kind field value (see below) is "CDL" (for Component Description Language). In this case the user is presented with a CDL editor with which to define the rules for deriving or prompting for the parameter value at graph execution time.

Description 312—This is a free format field in which a developer describes the expected values of the runtime parameter. It is used as a prompt at runtime if the default value contains a rule for asking the user for an input value.

Kind 314—This field defines where a graph is to obtain the value for the associated parameter at graph execution time. Supported kind field 314 values are:

Environment—The value for the runtime parameter is expected to be found in an environment variable of the same name. If the environment variable is not defined, then the value in the default value field 308 is used. If the parameter is required (i.e., an exported parameter), and the default value field 308 is empty, then a runtime error will be generated and graph execution will stop.

Positional—The value for the runtime parameter is expected at its relative position on a command line invoking the application. For example, if a runtime parameter is the third positional runtime parameter defined, then its parameter value will be expected as the third positional command line argument in an execution script. Any specified positional parameters must be provided and a runtime error will be generated if one is missing.

Keyword—The value for the runtime parameter is expected as a keyword command line parameter. In the illustrated embodiment, keyword parameters are of the form:

-<parameter name><parameter value>.

Keyword parameters are optional and a runtime error will only be generated if the keyword parameter is not provided and the default value field 308 is blank and a corresponding exported parameter is required.

Fixed—The runtime value for the parameter is always the default value. This is useful for sharing a constant value between two or more runtime parameters.

CDL—The default value of the runtime parameter contains a CDL expression which will be interpreted at graph execution to either derive the value of the runtime parameter from other parameters or prompt the user for additional input. The Component Description Language that is selected for use with any particular embodiment of the invention may be any suitable scripting language, such as the publicly available object-oriented scripting language "Python". Such scripts can construct metadata (types and transforms) under program control, and perform conditional tests, comparisons, data transformations, arithmetic and logical operations, string and list manipulations, and other functions on user input, externally programmatically supplied input, and other runtime parameters to generate a final value for any runtime parameter.

In the illustrated embodiment, a useful convention for referencing a runtime parameter that has been created directly on the runtime parameters grid 300 is to simply enter the parameter name preceded by the dollar sign "$". For example, $key references a runtime variable named key. In the illustrated embodiment, new runtime parameters default to a type of "string" and a default kind based on the value in the advanced options dialog for the default runtime kind (the default runtime kind is "Environment").

Because runtime parameter values can are determined at runtime, and CDL scripts can provide conditional testing, "conditional" runtime parameters can be created. A conditional runtime parameter causes a prompt to be generated for user input only if all of the conditions for the parameter—determined at runtime—are enabling. Thus, for example, if a user responds to a first prompt requesting whether a data set is to be sorted with "NO", a second, conditional prompt that requests a sort key need not be displayed.

Thus, during a design phase ("design time"), a developer designates a particular parameter of a graph component as a "runtime" parameter. An object associated with that graph component is then stored with the relevant parameter data (e.g., the types of information from the parameters grid 300 of FIG. 2).

Figure 4:
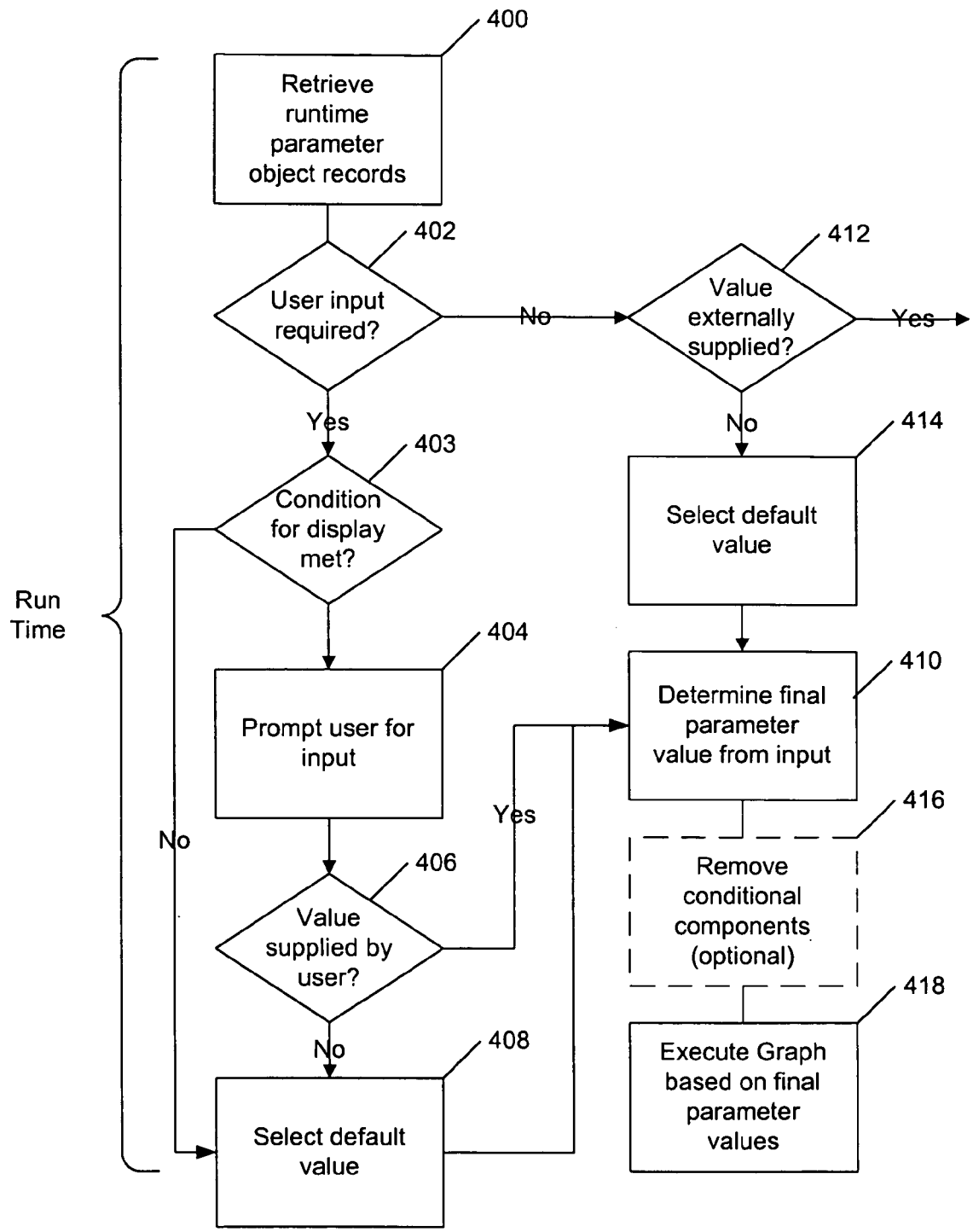
FIG. 4 is a flowchart that summarizes the process of using a runtime parameter.

FIG. 4 is a flowchart that summarizes the process of using a runtime parameter. During runtime, parameter objects corresponding to an application to be executed are retrieved (e.g., from a repository) (STEP 400). A determination is made for each such object as to whether user input is required (STEP 402). If so, a determination is made as to whether any condition for display of the prompt has been met (STEP 403), which may include evaluation of user input to prior prompts. If not, a default value is used (STEP 408). Alternatively, the parameter value may not be needed (e.g., a sort key would not be needed if the user did not choose to activate a sort function), and thus may be ignored. Otherwise, a prompt is generated for user input (STEP 404).

If the user does not input a value for a particular parameter (STEP 406), the default value for the parameter may be selected (STEP 408). Alternatively, an error condition may be raised to indicate the lack of user input. In any event (assuming no error condition because of a lack of user input), a determination is made of the final value for the parameter, taking into account transformations of the input and dependencies and conditions based on other parameters (STEP 410).

If a determination is made that user input is not required for a particular parameter (STEP 402), a determination is then made as to whether the parameter value is to be externally supplied programmatically, such as by an environment variable or a command line parameter (STEP 412). If not, the default value for the parameter is selected (STEP 414). Alternatively, an error condition may be raised to indicate the lack of available input of the specified type. In any event (assuming no error condition because of a lack of external input), a determination is made of the final value for the parameter, taking into account transformations of the input and dependencies and conditions based on other parameters (STEP 410).

Once the final parameter values are determined, as an optional step all conditional components (discussed below) can be removed either completely or replaced by flows (i.e., a graph link or edge), according to the specified conditions and the rules outlined above (STEP 416). Once the operational graph structure is finalized and the final parameter values are determined, the graph is executed in conventional fashion (STEP 418).

Test Values

In order to support a developer during the creation and testing of graphs with runtime parameters, the preferred embodiment of the GDE 102 also supports test values for runtime parameters. When a developer runs a graph with runtime parameters or wants to view the underlying code affecting a graph component, the GDE 102 displays an associated test parameters grid where the user can enter new test values for one or more runtime parameters. Preferably, the last set of test values used is remembered and saved with the graph.

For each runtime parameter, the developer enters a desired test value in a test value column. An edit field may be associated with each test value column. The test value field and edit field behave the same as the default value field and edit field in the runtime parameters grid 200 except when the parameter kind is CDL.

If a CDL expression indicates that the user is to be prompted for a value for a particular runtime parameter, then the test value field and the edit behavior are based on the interpretation of the associated CDL expression. If the CDL expression simply derives a value based on other input, then in normal mode the runtime parameter is not visible in the test values grid.

Specifying how Runtime Parameters Get their Values

After a parameter has been designated as a runtime parameter, a corresponding object is created in the repository 104. If the runtime parameter has a kind field 214 value of "CDL", the default value field 308 for the parameter includes a prompt_for pseudo-function with the following preferred form:

prompt_for "prompt-kind[modifiers]" options . . .

As indicated above, the prompt_for pseudo-function may be part of a conditional expression that determines whether a prompt is to be displayed based on prior input.

For such objects, a user interface is required to present direct entry runtime parameters to a user. In the preferred embodiment, the Web Interface 108 provides this function. In particular, during runtime, each prompt_for pseudo-function of each runtime parameter object is parsed by the Web Interface 108 to generate a web page (e.g., in HTML) having a corresponding user prompt. (Alternatively, such web pages can be generated before runtime and simply presented at runtime. However, runtime generation of such web pages provides greater flexibility. In particular, the contents of a page can depend on prior user input.) The Web Interface 108 is used in conjunction with a conventional web browser that can display such web pages and receive user input.

The prompt_for pseudo-function indicates to the Web Interface 108 how to prompt for a parameter value. In particular, the prompt-kind parameter, a string constant, indicates what kind of user interface (UI) element to present (text box, dropdown list, etc.). The modifiers part of the string, a comma-separated list of keywords, provides some options common for various kinds of prompts. In the illustrated embodiment, space is not significant within the modifiers string. Modifier keywords are interpreted as follows:

The keyword in place declares that the element should be presented directly at the summary level user interface for an application, allowing the value to be supplied without "drilling in" to a lower level. If in place is not specified, a simple "edit" button is presented at the summary level interface which will takes a user to another page to supply the parameter value.

The keyword blank ok declares that a user need not supply a value; the application will deal with the default value in a reasonable way. If blank ok is not specified, then the user will not be able to execute the application without supplying some value.

Following are some examples of prompt_for calls with different kinds of modifiers:

${prompt_for "text,inplace"}
${prompt_for "filter, in place", $input_type}
${prompt_for "radio, blankok, in place", ${list 1, 2, 3}}

Figure 5:
FIG. 5 is a diagram of one embodiment of a graphical dialog generated by the key prompt.

The remainder of this section lists a variety of prompt-kinds and their corresponding options and explains how each would appear in a web page generated by the Web Interface 108.

text [size]—Presents a conventional single-line text box size characters wide (if size is not supplied it defaults to the browser's default size for text boxes).

radio choice-list [description-list]—Presents a conventional "choose one" prompt in the form of a set of radio buttons, one button for each element of the choice-list. If description-list is supplied, each choice is labeled with the corresponding description; otherwise, the choices are labeled with the string form of the corresponding item from the choice-list.

radioplus choice-list [description-list]—Like radio, but presents an additional button next to a text box, to allow a user to choose a "write-in" value not in the choice-list.

checkbox choice-list [description-list]—Presents a conventional "choose zero or more" prompt in the form of a set of check boxes, one button for each element of the choice-list. If description-list is supplied, each choice is labeled with the corresponding description; otherwise, the choices are labeled with the string form of the corresponding item from the choice-list.

dropdown choice-list [description-list, size]—Presents a conventional "choose one" prompt in the form of a dropdown list for the elements of the choice-list. If description-list is supplied, each choice is labeled with the corresponding description; otherwise, the choices are labeled with the string form of the corresponding item from the choice-list. If size is supplied, that many choices will be visible at once; otherwise, only one will be visible.

multidropdown choice-list [description-list, size]—Presents a conventional "choose zero or more" prompt in the form of a dropdown list for the elements of the choice-list. If description-list is supplied, each choice is labeled with the corresponding description; otherwise, the choices are labeled with the string form of the corresponding item from the choice-list. If size is supplied, that many choices will be visible at once; otherwise, the browser's default number of items is shown.

key type-obj [size]—Presents a prompt for a key (also known as a collator) made up of fields from the given type-obj. The key can have as many as size parts, which defaults to the number of fields in type-obj. FIG. 5 is a diagram of one embodiment of a graphical dialog 500 generated by the key prompt. Following is an example of the script text for a 3-entry key prompt, where the file /datasets/ fixed defines the contents of the available keys shown in the drop down boxes 502:

$ {prompt_for "key", $ {dataset_type "/datasets/fixed"}, 3}

Figure 6:
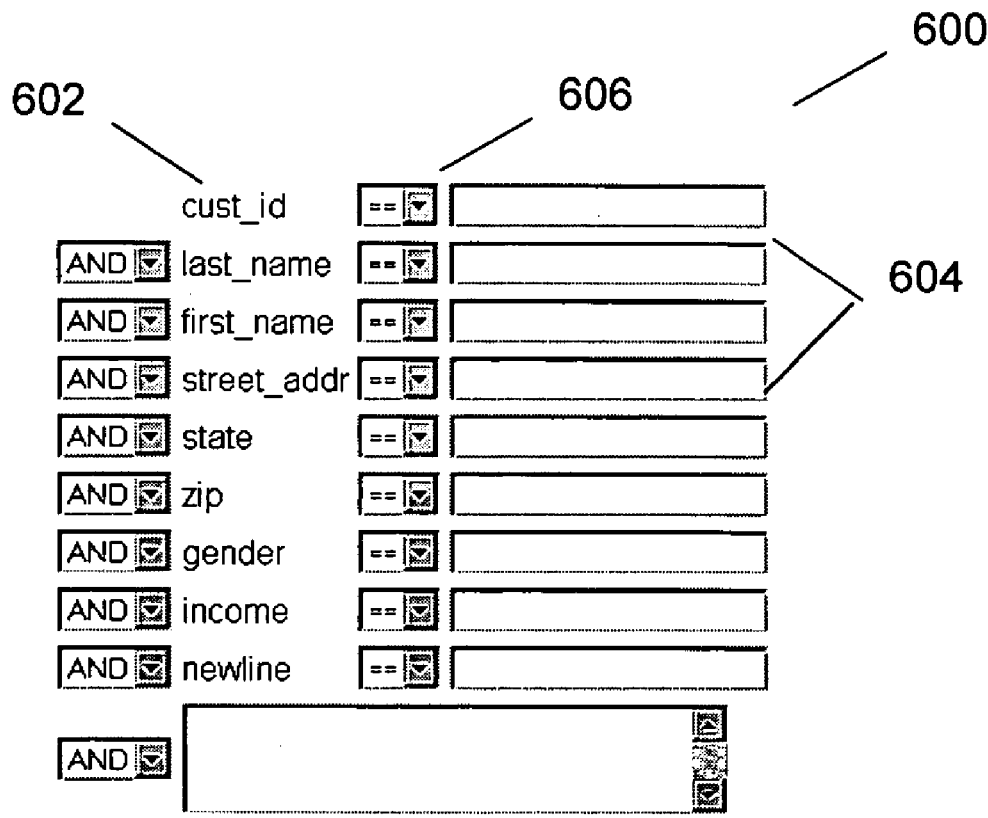
FIG. 6 is a diagram of one embodiment of a graphical dialog generated by the filter prompt.
Figure 7:
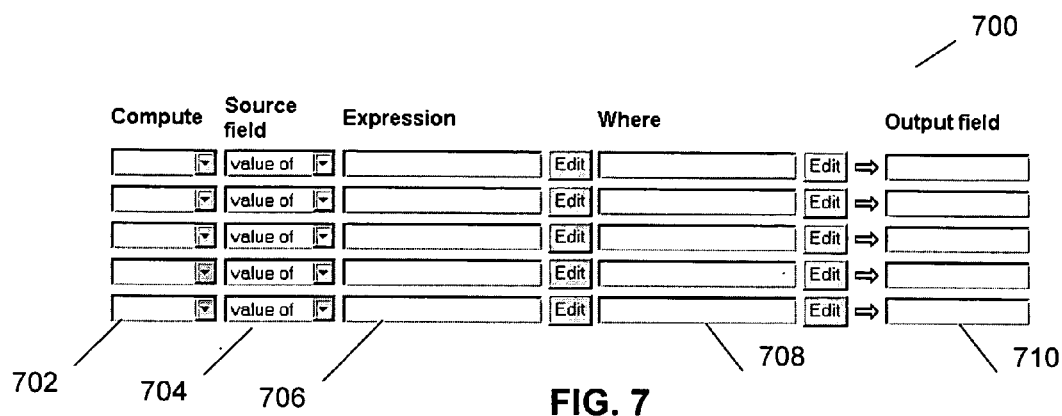
FIG. 7 is a diagram of one embodiment of a graphical dialog generated by the rollup prompt.
Figure 8:
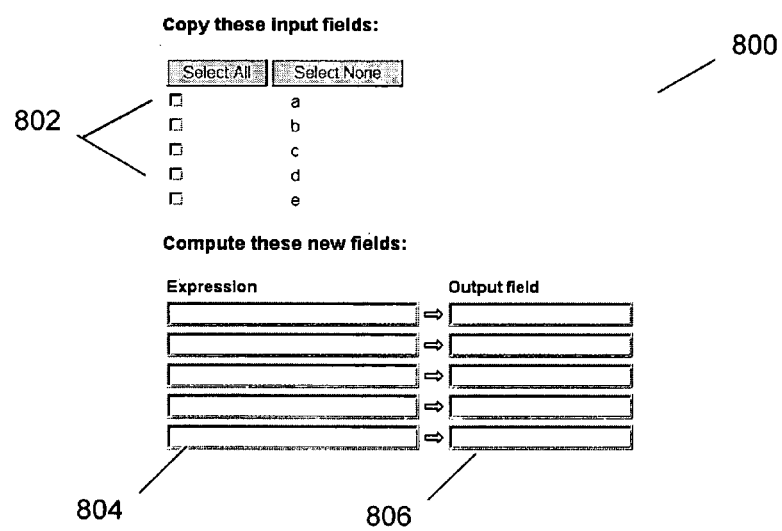
FIG. 8 is a diagram of one embodiment of a graphical dialog generated by the reformat prompt.

In the illustrated embodiment, the normal collation order is ascending, but a user can select a descending collation order for a key by checking an associated check box 504.

filter type-obj—Presents a prompt for a filter expression made up of conditions on each field of the given type-obj. The blank ok modifier has no effect for filters; a blank filter yields a "True" expression. FIG. 6 is a diagram of one embodiment of a graphical dialog 600 generated by the filter prompt. The available field names 602 associated with each expression text edit box 604 are defined by type-obj. Comparison values are entered into the text edit boxes 604, and a comparison operator (e.g., equal, greater than, less than or equal to) is selected from a corresponding dropdown list control 606.

flexifilter type-obj—Similar to the filter prompt, but presents a prompt for a filter expression made up of conditions on each field of the given type-obj where the field name on each line is selectable from a dropdown list. This permits using the same field for multiple conditions (e.g., field STATE=MA OR field STATE=CA).

roll up type-obj key [size]—Presents a prompt for a rollup computation based on the fields of the given type-obj being rolled up by the given key. The rollup can have as many as size rules, which defaults to the number of fields in type-obj. The blank ok modifier has no effect for rollups; a blank rollup yields a package that provides just the key value for each group. FIG. 7 is a diagram of one embodiment of a graphical dialog 700 generated by the rollup prompt. In the illustrated embodiment, a column of dropdown boxes 702 defines the available rollup computation functions (e.g., sum, minimum, maximum). The available field names 704 associated with each computation are defined by type-obj. Each rollup rule has an associated text edit box 706 for user definition of a desired expression, a "where" text edit box 708 for defining (through a boolean expression) criteria under which the source value will take part in the computation, and an output field text edit box 710 for designating a field that will receive the computation result. In cases where it can be unambiguously derived, the name of the output field need not be specified.

reformat type-obj [size]—Presents a prompt for a reformat computation based on the fields of the given type-obj. The reformat can have as many as size rules, which defaults to the number of fields in type-obj. FIG. 8 is a diagram of one embodiment of a graphical dialog 800 generated by the reformat prompt. In the illustrated embodiment, the reformat prompt includes a section 802 for simply copying input fields to like-named output fields (either selected/deselected individually using checkbox controls or collectively by using Select All or Select None buttons). A second section of the prompt includes a column of text edit boxes 804 that allow definition of reformatting expressions (e.g., total=revenue_1−revenue_2). Each rule has an associated output field text edit box 806 for designating a field that will receive the reformatted result.

outputspec—Presents a prompt for an output dataset specification. The displayed control includes a dropdown control for presenting available format options, and a text edit box for entering the name of a specific instance of the output dataset. The blank ok modifier has no effect for output dataset specifications.

fpath starting-point—Presents a prompt for a file path. The prompt is essentially a text box, but has a "Browse" button next to it that will cause a popup window to appear for browsing for a file path. If the text box is non-blank, then it will be used as the starting point for the browsing operation; if it is blank, the starting-point argument is used.

rpath starting-point—Presents a prompt for a repository path. The prompt is essentially a text box, but has a "Browse" button next to it that will cause a popup window to appear for browsing. If the text box is non-blank, then it will be used as the starting point for the browsing operation; if it is blank, the starting-point argument is used.

radiofpath choice-list [description-list]—Like radioplus, but presents an fpath-style box-plus-browse-button in the "write-in" slot.

radiorpath choice-list [description-list]—Like radioplus, but presents an rpath-style box-plus-browse-button in the "write-in" slot.

Conditional Components

One embodiment of the invention includes a conditional components mechanism that permits changes to the structure of the components and flows of a graph based on parameter values and computed metadata. Each component of a graph has a condition which controls whether or not that component will appear in the graph at runtime. The condition can be computed directly or indirectly through runtime parameters. Conditional components can be used for a variety of purposes, such as to optimize or specialize graphs. For optimization, an application might omit processing of certain datasets if values from them will not be used, thus allowing the graph to run more efficiently. For specialization, an application might condition the production of several different output datasets based on the level of detail desired, or allow execution of one of several optional portions of a graph.

FIG. 9A is a block diagram of a first graph in which a MergeJoin component 900 joins data from files A and B and outputs the result to an output file 902. FIG. 9B is a block diagram of a second graph in which a Rollup component 904 aggregates data from file A and outputs the result to an output file 902. FIG. 9C is a block diagram of a graph in which a MergeJoin component 906 joins data from files A and B, and a Rollup component 908 aggregates the resulting data and outputs a final result to an output file 902. Using conditional components, these three graphs can be combined into a single graph that initially looks like the graph of FIG. 9C, but the exact structure of which is not determined until runtime. By setting appropriate conditions, the Rollup component 908 can be replaced by a connection (flow), resulting in a runtime graph similar to the graph of FIG. 9A. Similarly, by setting appropriate conditions, the MergeJoin component 906 can be replaced by a connection (flow) to file A, resulting in a runtime graph similar to the graph of FIG. 9B.

In the illustrated embodiment, a conditional component can be any graph component that defines a vertex (i.e., a dataset component such as an input/output file, a processing component such as a reformat or sort component, or other graphs, known as subgraphs). In the preferred embodiment, a conditional component is controlled by two special parameters: a Condition and a Condition-interpretation. A Condition is a boolean expression or value whose evaluation is deferred until runtime. In the illustrated embodiment, the values "false" and "0" specify a false condition, all other values (including empty) indicate a true condition. A Condition-interpretation parameter has two allowed mutually exclusive values: Remove Completely and Replace With Flow.

Figure 10:
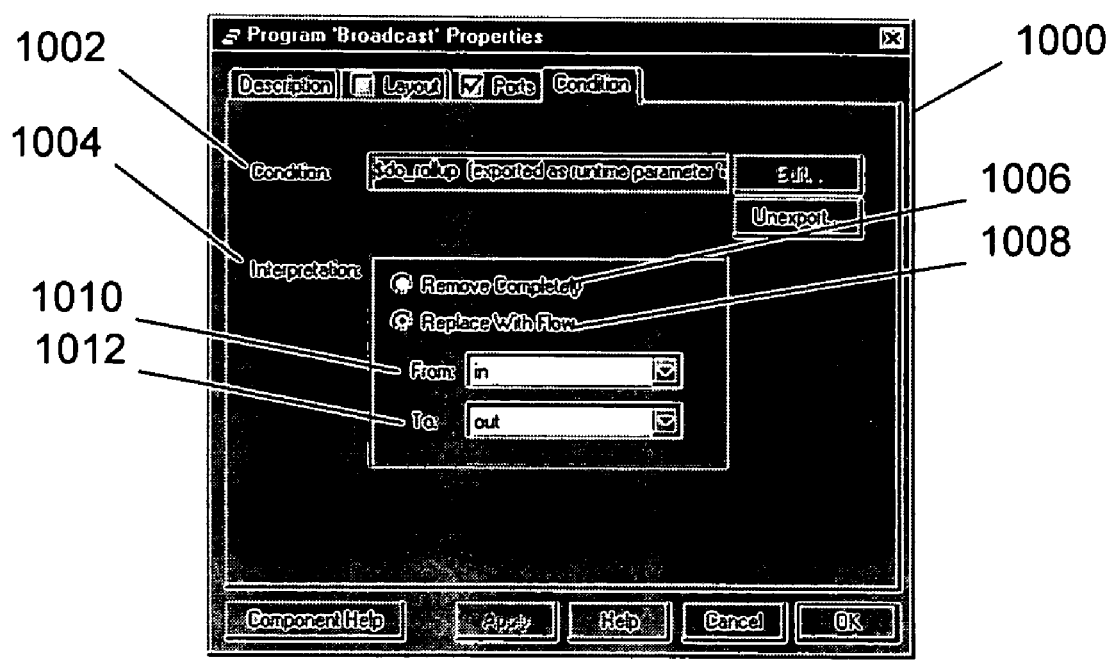
FIG. 10 is a diagram of one embodiment of a graphical dialog presenting a Condition having a Condition-interpretation control.

FIG. 10 is a diagram of one embodiment of a graphical dialog 1000 presenting a Condition 1002 having a Condition-interpretation control 1004. The Condition-interpretation control 1004 allows selection of either a Remove Completely interpretation 1006 or a Replace With Flow interpretation 1008.

Remove Completely: With this interpretation, if the Condition is met, the component and all of its connected flows (i.e., graph links or edges) are to be removed from the graph. An active Remove Completely condition functionally removes the component and all its directly connected flows from a graph. Remove Completely conditions can be used on any component.

Figure 11:
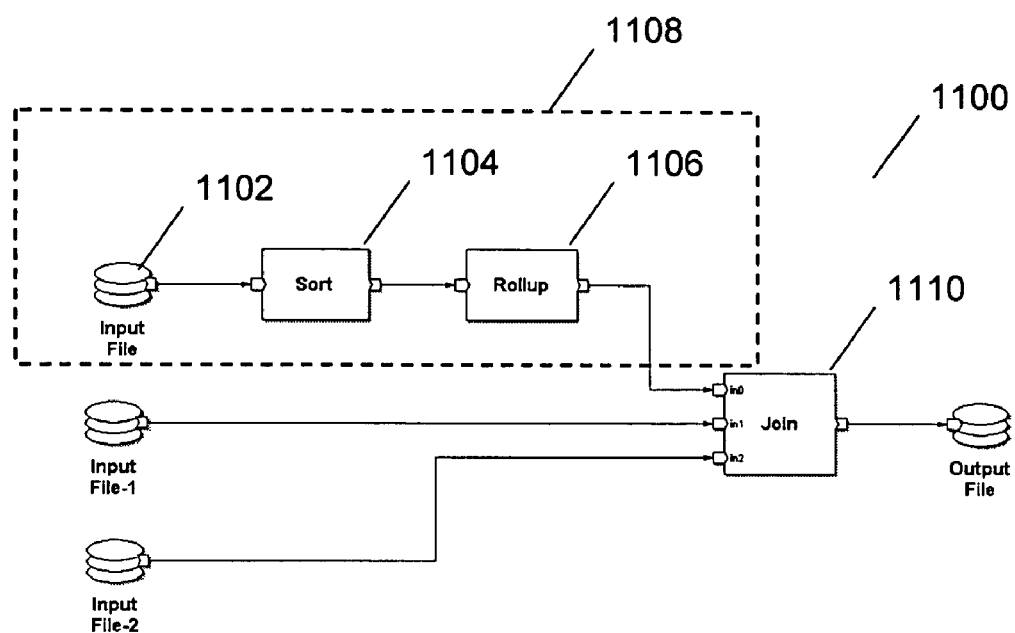
FIG. 11 is a diagram of a graph showing a situation in which poisoning arises.

A conditional component that is removed from a graph can "poison" other connected components that depend on the presence of the conditional component, causing their removal. FIG. 11 is a diagram of a graph 1100 showing a situation in which such poisoning arises. If the condition on the Input File component 1102 indicates removal and its corresponding condition-interpretation is Remove Completely, then both the Input File component 1102 and its connected flow are removed from the graph 1100. This in turn poisons the Sort component 1104, causing it to be removed because its input is a required input port, but there are no longer any data flows connected to it. This in turn poisons the Rollup component 1106, causing it to be removed because its input is a required input port, but there are no longer any data flows connected to it. The only thing that stops this "poison of disappearance" is connection to an optional or counted port of a downstream component. Thus, the entire sort-rollup graph branch 1108 is effectively removed from the graph 1100 when the condition on the Input File component 1102 indicates removal. The result in FIG. 11 is that the nominally 3-input Join component 1110 of the original graph structure becomes a 2-input Join component at runtime.

In the preferred embodiment, the detailed semantics of poisoning (also known as "implied conditions") are as follows:

If a component has a required port and there are no live flows connected to it, the component and all flows connected to it are removed from the graph.

If a component is removed completely from a graph, then all flows connected to its ports are removed from the graph.

If a component is replaced with a flow, then all flows connected to all ports other than that component's designated input port and designated output port are removed from the graph.

If a required indexed port has no live flows connected to it, then for each corresponding optional indexed port with the same index, any flows connected to that corresponding port are removed from the graph.

There are some surprising consequences of these rules. For example, a component with only optional ports can never be removed because of poisoning. Therefore, it must be explicitly removed if desired.

Figure 12:
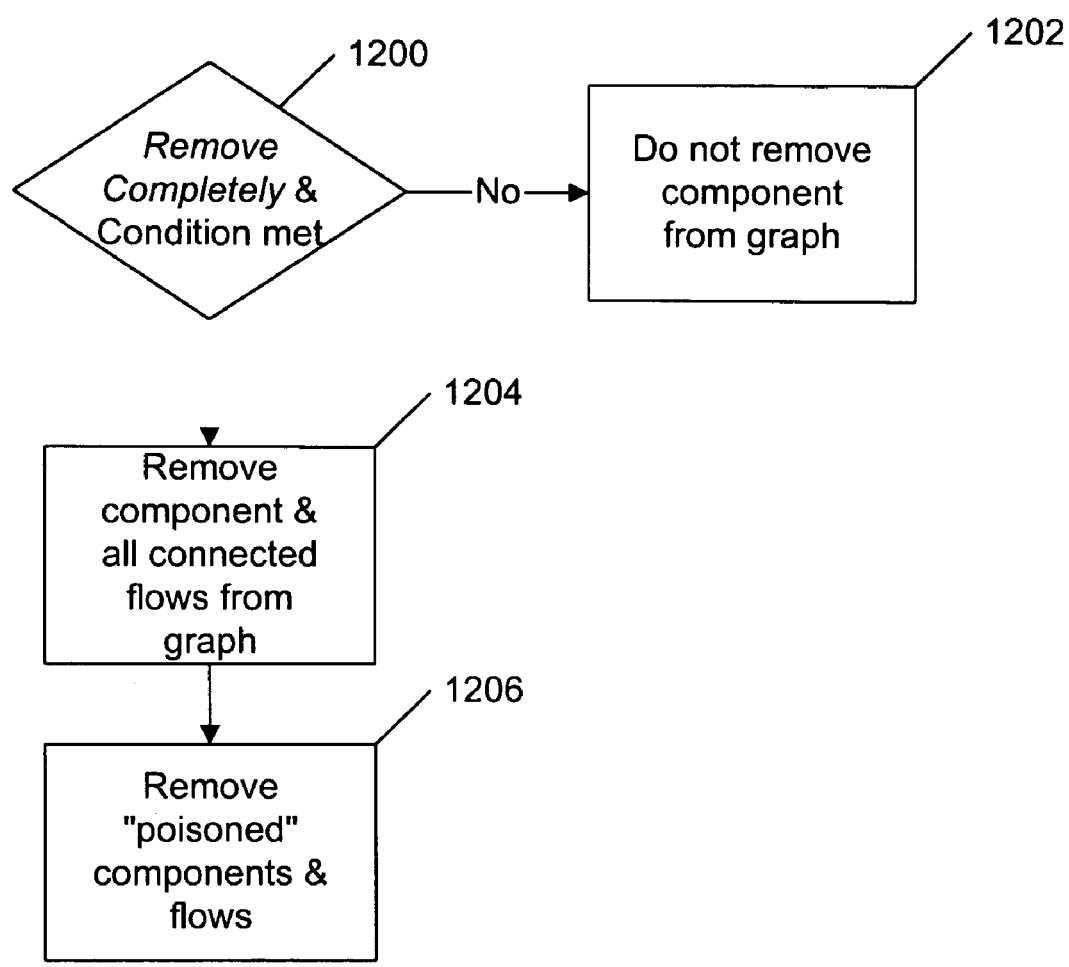
FIG. 12 is a flowchart that summarizes the process of runtime preparation of a graph that includes a Remove Completely conditional component.

FIG. 12 is a flowchart that summarizes the process of runtime preparation of a graph that includes a Remove Completely conditional component. If the Condition-interpretation is Remove Completely and the Condition is not met (STEP 1200), then the conditional COMPONENT is not removed from the graph (STEP 1202). If the Condition is met (Step 1200), then the conditional component is removed from the graph, along with all flows connected to that component (STEP 1204). All "poisoned" components and flows are then removed from the graph, in accordance with the rules set forth above (STEP 1206).

Replace With Flow: With this interpretation, if the Condition is met, the component is to be replaced with a flow (i.e., a graph edge). A Replace With Flow condition-interpretation needs additional information. Referring to FIG. 10, the user designates an input port 1010 (or a family of counted ports) and an output port 1012 (or a family of counted ports) through which to make connections when the component is removed from a graph. By default, if there is exactly one required input port or counted port, and exactly one required output port or counted port, those are the designated flow-through connection ports (termed the designated input port and the designated output port, respectively). A required port is one that requires at least one flow to be connected.

Figure 13:
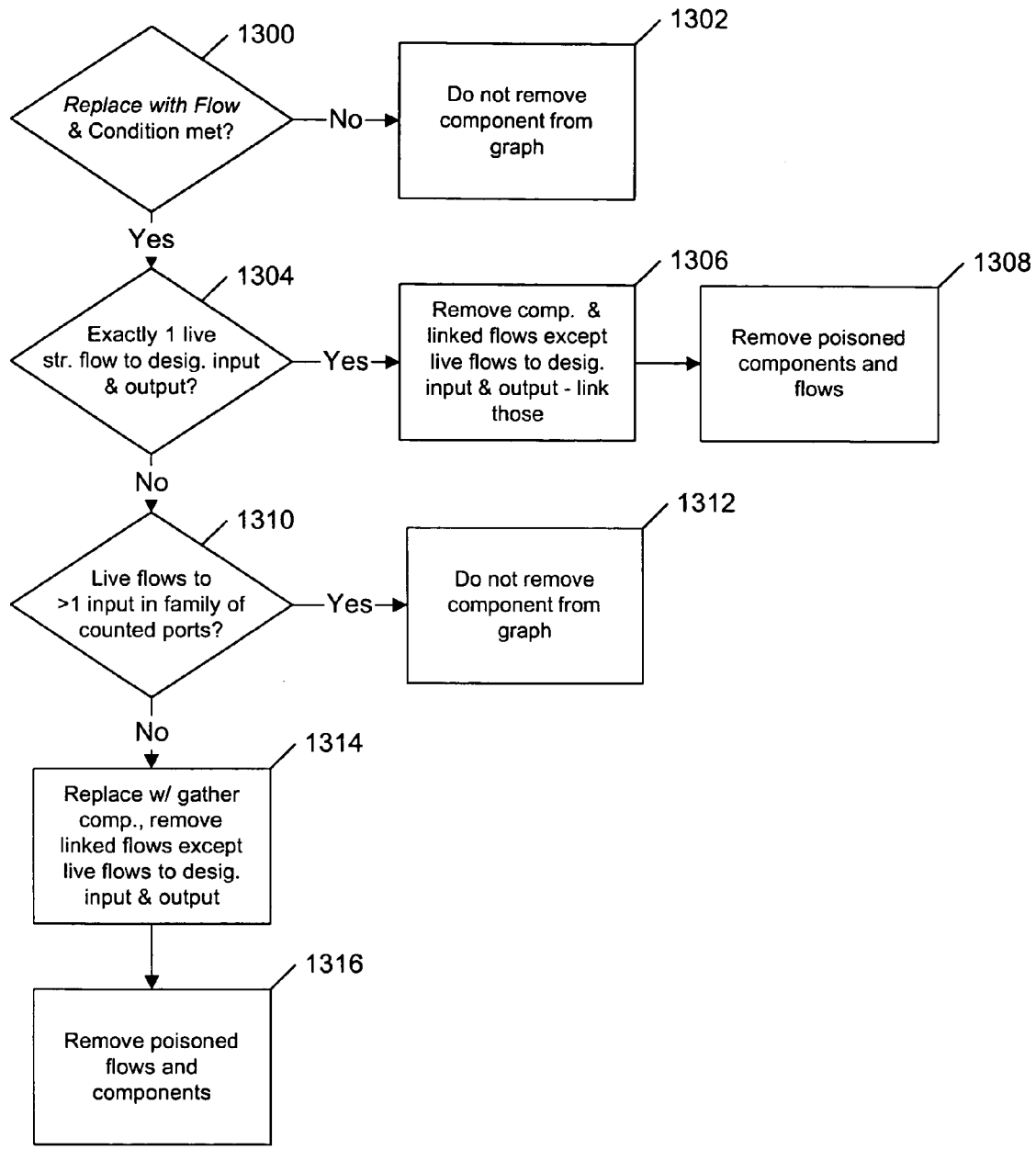
FIG. 13 is a flowchart that summarizes the process of runtime preparation of a graph that includes a Replace With Flow conditional component for a particular embodiment of the invention.

FIG. 13 is a flowchart that summarizes the process of runtime preparation of a graph that includes a Replace With Flow conditional component for a particular embodiment of the invention. Because of the dependency of some components on certain available inputs and outputs in the illustrated embodiment (which is based on components available in the CO>OPERATING SYSTEM®), several rules apply to this implementation and use of a Replace With Flow condition:

If the Condition-interpretation is Replace with Flow and the Condition is not met (STEP 1300), then the conditional component is not removed from the graph (STEP 1302).

A component with a designated input port and a designated output port can be replaced with a flow only if there is exactly one live straight flow connected to its designated input port, and exactly one live straight flow connected to its designated output port (a "live" flow is a flow that has not been removed at run-time) (STEP 1304). If so, the component itself is removed from the graph, and the straight live flow connected to its designated input port and the straight live flow connected to its designated output port are linked together (STEP 1306). Any other flows directly linked to the removed component's other ports (i.e., any ports other than the specially designated input and output ports) are removed from the graph. Any "poisoned" components and flows that were connected to the removed component are removed, as described above (STEP 1308).

If a component with a Replace With Flow condition has live flows attached to more than one designated input port in a family of counted inputs (STEP 1310), then it is not removed from a graph, because the component is needed to make the graph valid (STEP 1312).

Components that have live fan-in-flows on required inputs require special handling. A "live fan-in flow" means either the component has a live fan-in or all-to-all flow connected to a required input port, or it has more than one live straight flow connected to a single required input port. For such components, interpreting a Replace With Flow condition should replace the conditional component with a gather component which gathers all of live input flows (STEP 1314). Any "poisoned" flows and components that were connected to the replaced component are then removed, as described above (STEP 1316).

Metadata Propagation

In the preferred embodiment, when a flow is generated after the removal of a graph component, a choice must be made as to how metadata defining the data in such flow should propagate in the revised graph. Metadata may be available from either end of the flow. In the preferred embodiment of the invention, the metadata from the upstream end of the flow is preferred.

If the upstream end of the flow is a removed component (or a component that has been replaced by a gather component), then the GDE 102 finds metadata for the flow by "walking" upstream in the graph until it finds a component that has not been removed. The metadata exposed by that upstream component is used to define the characteristics of the data for the generated flow.

Typical Usage

Typically, a user sits in front of the Web Interface 108 and finds in the repository 104 the graph of an application the user would like to run. By scanning all of the objects associated with the application graph, the Web Interface 108 generates web page forms that allow the user to specify values for the runtime parameters of the application. Once all runtime parameters have been specified, the combination of the application and the parameter settings are brought together as a job, which is scheduled for execution by the executive 110. When it comes time to run the job, the executive 110 queues the application for execution under the parallel operating system 106, in known fashion. The parallel operating system 106 collects tracking information and job status and stores this information in the repository 104 so that users and administrators can track the progress and performance of jobs.

EXAMPLES

Figure 14:
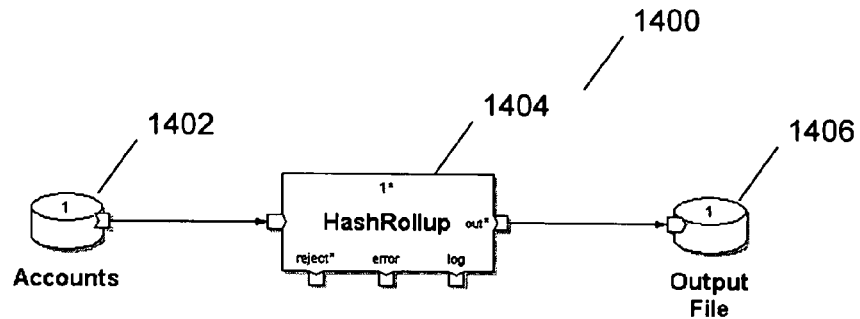
FIG. 14 is a diagram of a graph representing a rollup application without runtime parameters.

FIG. 14 is a diagram of a graph 1400 representing a rollup application without runtime parameters. This graph computes the number of accounts of each kind and writes the results to an output file. Every aspect of this application has been determined by the developer who created the graph: the name of the input file component 1402, the format of the input data, the key and transform rules used to roll up the data in a HashRollup component 1404, the output format, and the name of the output file component 1406. A user can only execute this graph exactly as defined.

Figure 15:
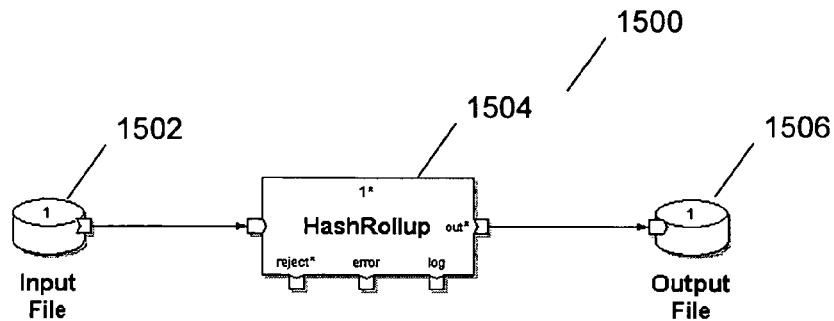
FIG. 15 is a diagram of a graph representing a runtime parameterized version of the rollup application of FIG. 14.

FIG. 15 is a diagram of a graph 1500 representing a runtime parameterized version of the rollup application of FIG. 14. The dataflow graph structure of this application is very similar to the non-runtime parameterized version, but the application is much more flexible. Through runtime parameters, an end user may specify the name of the abstracted input dataset 1502 (a reposited object from which the input file name and format will be derived), the rollup key and rollup rules for the HashRollup component 1504, and the name of the output file component 1506.

Figure 16:
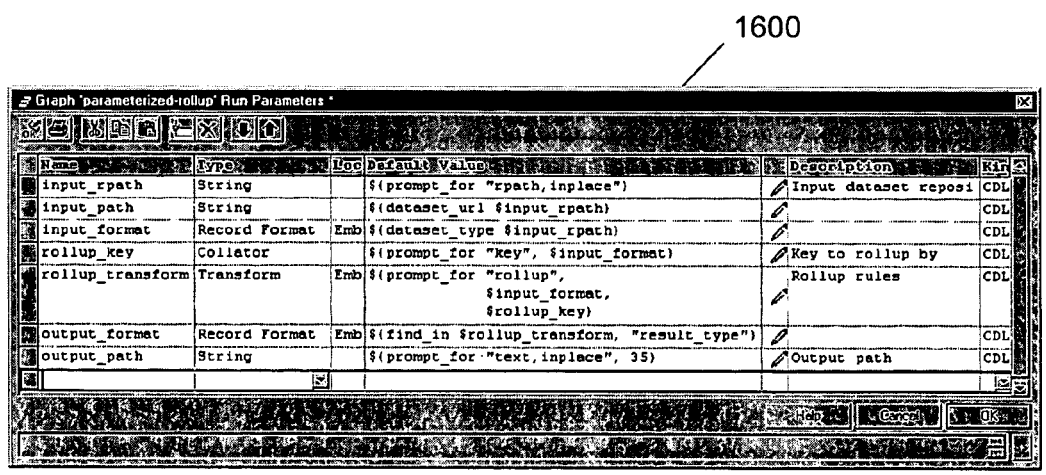
FIG. 16 is a diagram of one embodiment of a graphical dialog representing a runtime parameters grid for the example application of FIG. 15.

FIG. 16 is a diagram of one embodiment of a graphical dialog representing a runtime parameters grid 1600 for the example application of FIG. 15. This is a filled in version of the parameters grid shown in FIG. 2. Note that a number of default parameters are defined using the prompt_for pseudo-function, as described above, and thus require user input through the Web Interface 108. While the appearance of this graph differs little from the non-runtime parameterized application graph, one or more parameter grids (or other suitable control) enable a developer to completely track all parameters that control the execution of the graph.

Figure 17A:
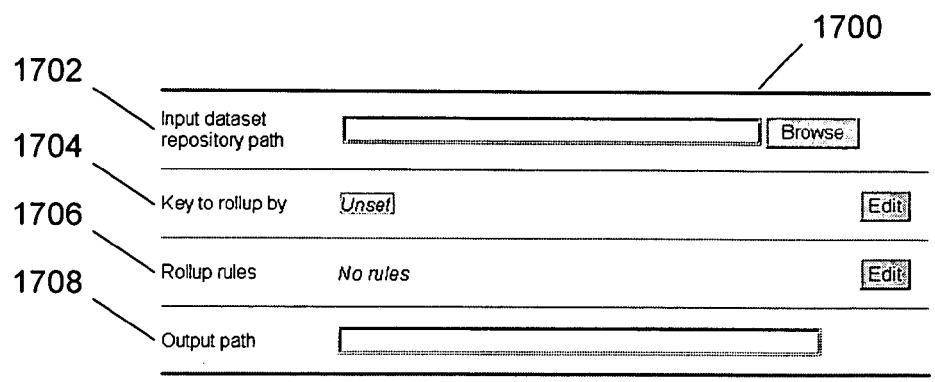
FIG. 17A is a diagram of one embodiment of a graphical dialog representing a form generated by the Web Interface from the information in the parameters grid of FIG. 16.
Figure 17B:
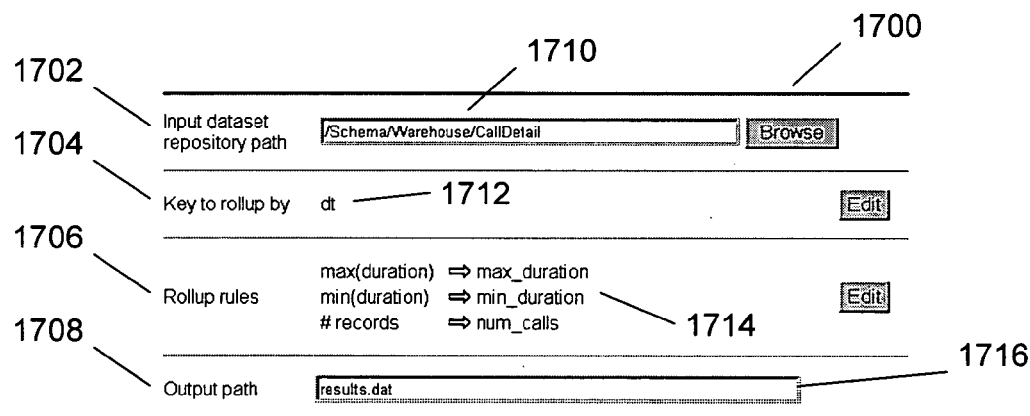
FIG. 17B is a diagram of the form of FIG. 17A filled in by a user with parameter values.

FIG. 17A is a diagram of one embodiment of a graphical dialog representing a form 1700 generated by the Web Interface 108 from the information in the parameters grid 1600 of FIG. 16. In this example, the form 1700 presents four runtime parameters for user input: an input dataset repository path 1702, a rollup key 1704, rollup rules 1706, and an output path 1708. FIG. 17B is a diagram of the form 1700 of FIG. 17A filled in by a user with parameter values. Using direct entry and/or edit or browser control buttons associated with the runtime parameters 1702-1708, a user provides corresponding parameter values 1710-1716 for executing the associated graph.

FIG. 18 is a diagram of a graph 1800 representing a runtime parameterized rollup and join application. FIG. 19 is a diagram of one embodiment of a graphical dialog representing a runtime parameters grid 1900 for the example application of FIG. 18. Here, some aspects of the application have been parameterized, but most, including the join key and the input datasets, remain fixed. FIG. 20 is a diagram of one embodiment of a graphical dialog representing a form 2000 generated by the Web Interface 108 from the information in the parameters grid 1900 of FIG. 19. Note that since the input type to the rollup is known at the time the top-level form is displayed, the rollup rules 2002 can be prompted for in-place.

Figure 21:
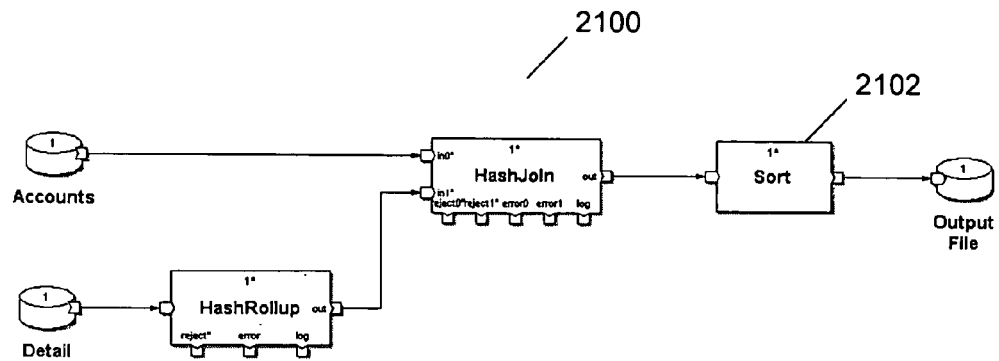
FIG. 21 is a diagram of a graph representing a runtime parameterized rollup-join-sort application.
Figure 22:
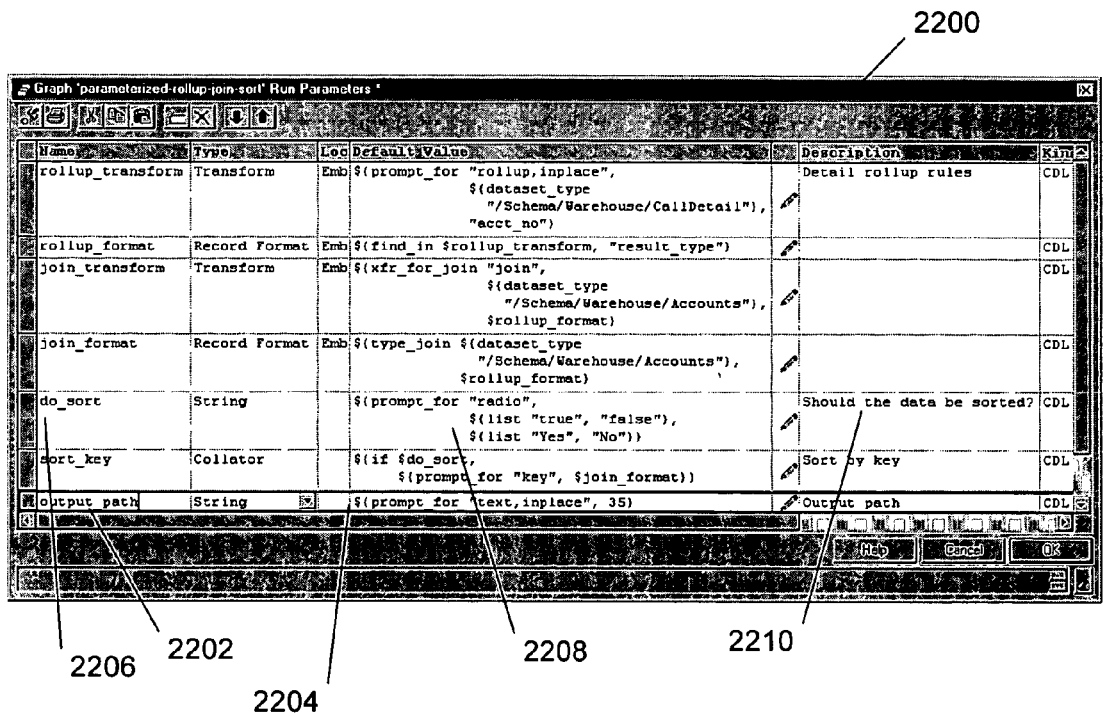
FIG. 22 is a diagram of one embodiment of a graphical dialog representing a runtime parameters grid for the example application shown in FIG. 21.

FIG. 21 is a diagram of a graph 2100 representing a runtime parameterized rollup-join-sort application. While similar to the example in FIG. 18, a conditional sort component 2102 has been added to the graph 2100. FIG. 22 is a diagram of one embodiment of a graphical dialog representing a runtime parameters grid 2200 for the example application shown in FIG. 21. The sort_key runtime parameter 2202 is prompted for only if the user indicates that sorting is desired. To get this effect, a develop puts a prompt_for pseudo-function within an if conditional test for the default value 2204 of the sort_key runtime parameter 2202. The if conditional test references a second runtime parameter, do_sort 2206. The default value field 2208 and description field 2210 of the do_sort parameter 2206 are defined to generate a radio prompt asking the user for a true/false or yes/no answer to the text prompt "Should the data be sorted?". If the value provided for the do_sort parameter 2206 is "true", the sort component 2102 will be included as part of the graph at runtime. Otherwise, the sort component 2102 will be removed completely from the graph or replaced with flow, depending on its specified condition interpretation.

Script Implementation

While the GDE 102 facilitates construction of parameterized graphs, sometimes there are non-graph programs for which one would like to provide a forms-based interface. Using application-level CDL and the repository 104, one can parameterize arbitrary shell scripts.

For example, the description of an application can be written to a file with a structure similar to the following:

```
application AppName(
    description("One-line Description"),
    comment("Longer description"),
    parameter ParmName1(
        string, kind(keyword), required,
        description ("Short prompt for top-level form"),
        comment ("Longer prompt for out-of-line form"),
        default(${prompt_for . . . })
    ),
    parameter ParmName2(
        type, kind(derived),
```

```
default(CDL-expression)
),
... more parameters ...
script (="scriptname.ksh")
)
```

General Computer Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on one or more programmable computer systems each comprising at least one processor, at least one data storage system (including volatile and non-volatile memory and/or storage elements), at least one input device or port, and at least one output device or port. The program code is executed on the processors to perform the functions described herein.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., solid state, magnetic, or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, a number of the function steps described above may be performed in a different order without substantially affecting overall processing. For example, STEPS 402 and 412 in FIG. 4 may be performed in reverse order. Accordingly, other embodiments are within the scope of the following claims.

What is claimed is:

1. A method for modifying a graph-based representation of an executable data processing application, the graph-based representation including a graph having vertices representing components and links between components indicating flows of data between such components, at least some of the components comprising data processing components having parameters, including:
    programmatically retrieving definitions of runtime parameters for the graph at runtime execution of the graph, the runtime parameters being defined as determinable at runtime execution of the graph;
    determining whether a value for each of the runtime parameters is to be provided by user input;
    determining whether a value for each of the runtime parameters is to be externally supplied programmatically;
    displaying a prompt to a user for receiving user input for every runtime parameter so determined to be provided by user input;
    retrieving any externally supplied value for every runtime parameter determined to be externally supplied programmatically;
    determining parameter values for the runtime parameters based on the user input to such prompt or such externally supplied value or a default value;
    modifying the graph-based representation of the data processing application using the determined parameter values for the runtime parameters; and
    executing the data processing application represented by the modified graph-based representation to process at least one flow of data received by at least one data processing component.

2. The method of claim 1, further including providing an interface which permits designating a parameter of a graph component as a runtime parameter.

3. The method of claim 1, wherein determining the parameter values includes evaluating an expression.

4. The method of claim 3, wherein the expression computes metadata.

5. The method of claim 1, wherein a prompt for receiving user input is conditional, and displaying the prompt depends upon evaluation of user input to a prior displayed prompt.

6. The method of claim 1, wherein the flow of data is received by at least one data processing component from at least one dataset component.

7. A method for modifying a graph at runtime execution of the graph, the graph representing an executable computer application and having vertices representing components with parameters and links between components indicating flows of data between such components, the method including:
    determining at runtime execution of the graph whether any component of the graph is defined as being a conditional component having an associated condition and an associated condition-interpretation;
    evaluating the associated condition for every such conditional component;
    modifying the graph at runtime execution of the graph in accordance with such evaluation and the corresponding associated condition-interpretation of at least one such conditional component by removing such conditional component and all connected flows to such conditional component from the graph before execution of the graph, based on an evaluation of the associated condition and the corresponding associated condition-interpretation for such conditional component; and
    executing the application represented by the modified graph.

8. The method of claim 7, further including removing each component and flows connected to such components that depend on the presence of the removed conditional component.

9. A method for modifying a graph at runtime execution of the graph, the graph representing an executable computer application and having vertices representing components with parameters and links between components indicating flows of data between such components, the method including:
    determining at runtime execution of the graph whether any component of the graph is defined as being a conditional component having an associated condition and an associated condition-interpretation;

evaluating the associated condition for every such conditional component;

modifying the graph at runtime execution of the graph in accordance with such evaluation and the corresponding associated condition-interpretation of at least one such conditional component by replacing such conditional component with a flow before execution of the graph based on an evaluation of the associated condition and the corresponding condition-interpretation for such conditional component; and executing the application represented by the modified graph.

10. The method of claim 7 or 9, further including providing an interface which permits designating a condition and a condition-interpretation for a graph component.

11. A system for modifying a graph-based representation of an executable data processing application, the graph-based representation including a graph having vertices representing components and links between components indicating flows of data between such components, at least some of the components comprising data processing components having parameters, including:

means for programmatically retrieving definitions of runtime parameters for the graph at runtime execution of the graph, the runtime parameters being defined as determinable at runtime execution of the graph;

means for determining whether a value for each of the runtime parameters is to be provided by user input;

means for determining whether a value for each of the runtime parameters is to be externally supplied programmatically;

means for displaying a prompt to a user for receiving user input for every runtime parameter so determined to be provided by user input;

means for retrieving any externally supplied value for every runtime parameter determined to be externally supplied programmatically;

means for determining parameter values for the runtime parameters based on the user input to such prompt or such externally supplied value or a default value;

means for modifying the graph-based representation of the data processing application using the determined parameter values for the runtime parameters; and means for executing the data processing application represented by the modified graph-based representation to process at least one flow of data received by at least one data processing component.

12. The system of claim 11, further including an interface which permits designating a parameter of a graph component as a runtime parameter.

13. The system of claim 11, wherein the means for determining the parameter values includes means for evaluating an expression.

14. The system of claim 13, wherein the expression computes metadata.

15. The system of claim 11, wherein a prompt for receiving user input is conditional, and displaying the prompt depends upon evaluation of user input to a prior displayed prompt.

16. The system of claim 11, wherein the flow of data is received by at least one data processing component from at least one dataset component.

17. A system for modifying a graph at runtime execution of the graph, the graph representing an executable computer application and having vertices representing components with parameters and links between components indicating flows of data between such components, the system including:

means for determining at runtime execution of the graph whether any component of the graph is defined as being a conditional component having an associated condition and an associated condition-interpretation;

means for evaluating the associated condition for every such conditional component;

means for modifying the graph at runtime execution of the graph in accordance with such evaluation and the corresponding associated condition-interpretation of at least one such conditional component by removing such conditional component and all connected flows to such conditional component from the graph before execution of the graph, based on an evaluation of the associated condition and the corresponding associated condition-interpretation for such conditional component; and means for executing the application represented by the modified graph.

18. The system of claim 17, further including means for removing each component and flows connected to such components that depend on the presence of the removed conditional component.

19. A system for modifying a graph at runtime execution of the graph, the graph representing an executable computer application and having vertices representing components with parameters and links between components indicating flows of data between such components, the system including:

means for determining at runtime execution of the graph whether any component of the graph is defined as being a conditional component having an associated condition and an associated condition-interpretation;

means for evaluating the associated condition for every such conditional component;

means for modifying the graph at runtime execution of the graph in accordance with such evaluation and the corresponding associated condition-interpretation of at least one such conditional component by replacing such conditional component with a flow before execution of the graph based on an evaluation of the associated condition and the corresponding associated condition-interpretation for such conditional component; and means for executing the application represented by the modified graph.

20. The system of claim 17 or 19, further including an interface which permits designating a condition and a condition-interpretation for a graph component.

21. A computer program, stored on a computer-readable medium, for modifying a graph-based representation of an executable data processing application, the graph-based representation including a graph having vertices representing components and links between components indicating flows of data between such components, at least some of the components comprising data processing components having parameters, the computer program comprising instructions for causing a computer to:

programmatically retrieve definitions of runtime parameters for the graph at runtime execution of the graph, the runtime parameters being defined as determinable at runtime execution of the graph;

determine whether a value for each of the runtime parameters is to be provided by user input;

determine whether a value for each of the runtime parameters is to be externally supplied programmatically;

display a prompt to a user for receiving user input for every runtime parameter so determined to be provided by user input;

retrieve any externally supplied value for every runtime parameter determined to be externally supplied programmatically;

determine parameter values for the runtime parameters based on the user input to such prompt or such externally supplied value or a default value;

modify the graph-based representation of the data processing application using the determined parameter values for the runtime parameters; and execute the data processing application represented by the modified graph-based representation to process at least one flow of data received by at least one data processing component.

22. The computer program of claim 21, further including instructions for causing the computer to provide an interface which permits designating a parameter of a graph component as a runtime parameter.

23. The computer program of claim 21, wherein the instructions for causing the computer to determine the parameter values include instructions for causing the computer to evaluating an expression.

24. The computer program of claim 23, wherein the expression computes metadata.

25. The computer program of claim 21, wherein a prompt for receiving user input is conditional, and displaying the prompt depends upon evaluation of user input to a prior displayed prompt.

26. The computer program of claim 21, wherein the flow of data is received by at least one data processing component from at least one dataset component.

27. A computer program, stored on a computer-readable medium, for modifying a graph at runtime execution of the graph, the graph representing an executable computer application and having vertices representing components with parameters and links between components indicating flows of data between such components, the computer program comprising instructions for causing a computer to:

determine at runtime execution of the graph whether any component of the graph is defined as being a conditional component having an associated condition and an associated condition-interpretation;

evaluate the associated condition for every such conditional component;

modify the graph at runtime execution of the graph in accordance with such evaluation and the associated corresponding condition-interpretation of at least one such conditional component by removing such conditional component and all connected flows to such conditional component from the graph before execution of the graph, based on an evaluation of the associated condition and the corresponding associated condition-interpretation for such conditional component; and execute the application represented by the modified graph.

28. The computer program of claim 27, further including instructions for causing the computer to remove each component and flows connected to such components that depend on the presence of the conditional component.

29. A computer program, stored on a computer-readable medium, for modifying a graph at runtime execution of the graph, the graph representing an executable computer application and having vertices representing components with parameters and links between components indicating flows of data between such components, the computer program comprising instructions for causing a computer to:

determine at runtime execution of the graph whether any component of the graph is defined as being a conditional component having an associated condition and an associated condition-interpretation;

evaluate the associated condition for every such conditional component;

modify the graph at runtime execution of the graph in accordance with such evaluation and the corresponding associated condition-interpretation of at least one such conditional component by replacing the conditional component with a flow before execution of the graph based on an evaluation of the condition and the corresponding condition-interpretation for such conditional component; and execute the application represented by the modified graph.

30. The computer program of claim 27 or 29, further including instructions for causing the computer to provide an interface which permits designating a condition and a condition-interpretation for a graph component.

* * * * *